United States Patent [19]

Ripani et al.

[11] Patent Number: 4,603,815
[45] Date of Patent: Aug. 5, 1986

[54] CONTROLLED OPERATION CHOCOLATE REFINER

[75] Inventors: Sergio Ripani; Giulio Serafini, both of Milan, Italy

[73] Assignee: Carle & Montanari S.p.A., Milan, Italy

[21] Appl. No.: 585,297

[22] Filed: Mar. 1, 1984

[30] Foreign Application Priority Data

Jun. 29, 1983 [IT] Italy ................. 21857 A/83

[51] Int. Cl.$^4$ ............................................. B02C 4/04
[52] U.S. Cl. ........................................ 241/36; 241/37; 241/232
[58] Field of Search ............... 241/205, 206, 33, 36, 241/37, 63, 64, 231, 232, 233; 425/194, 201; 100/47

[56] References Cited

U.S. PATENT DOCUMENTS

| | | | |
|---|---|---|---|
| 924,352 | 6/1909 | Hogue | 241/205 X |
| 2,327,448 | 8/1943 | Olive | 241/36 X |
| 3,182,587 | 5/1965 | Woodhall | 241/37 X |
| 3,600,747 | 8/1971 | McCarty | 241/37 X |
| 4,117,054 | 9/1978 | Salo | 100/47 X |

Primary Examiner—Mark Rosenbaum
Attorney, Agent, or Firm—Stefan J. Klauber

[57] ABSTRACT

A refiner for mixtures and suspensions having a non-Newtonian rheological characteristic, such as chocolate, which comprises a plurality of power driven refining rollers, and a means of changing the pressure thereof on the respective supports, wherein a means is also provided which is effective to change the actual crowning of the rollers, or the effect of an equivalent crowning, as well as a means of changing the speed of said refining rollers. The crown change is achieved by having the individual rollers supported on an oscillating support adapted to oscillate its respective roller relatively to the associated roller by rotation about an orthogonal midaxis with respect to the roller longitudinal axes, thereby a contact point is established at the roller middle area or circumference while their ends are offset. The speed of the refining rollers is changed through independent and individually operated controls, such as a DC motor. By changing the pressure, crowning, and speed of the rollers, either individually or in combination, the machine may find universal applicability to different viscosity products in desired conditions.

3 Claims, 21 Drawing Figures

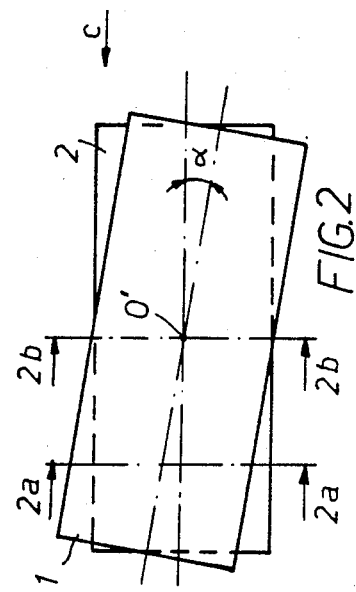
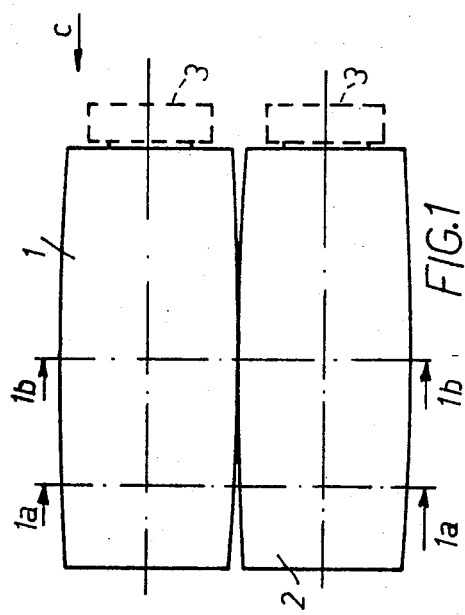
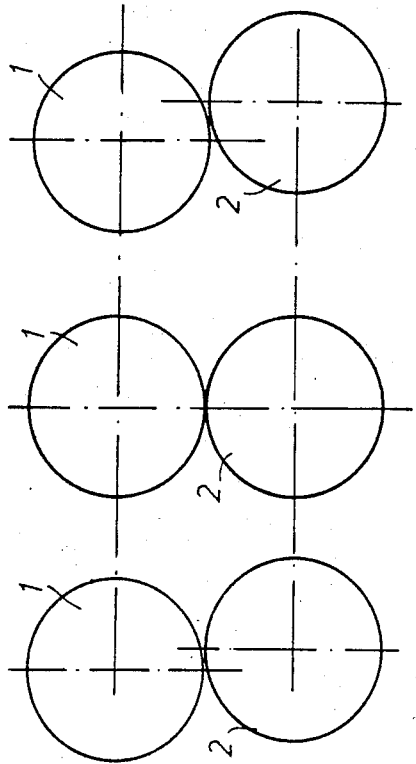
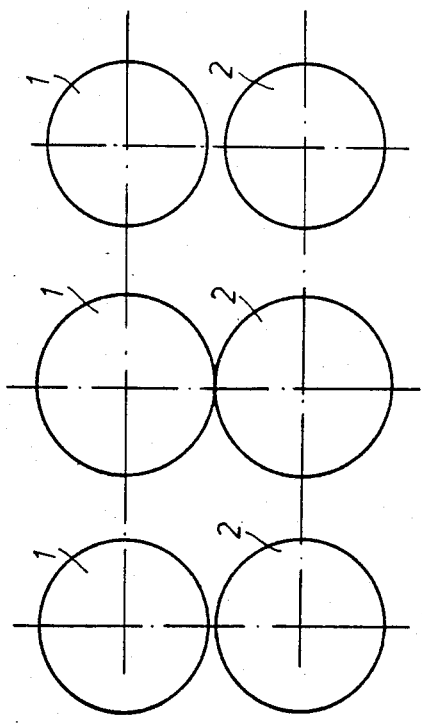

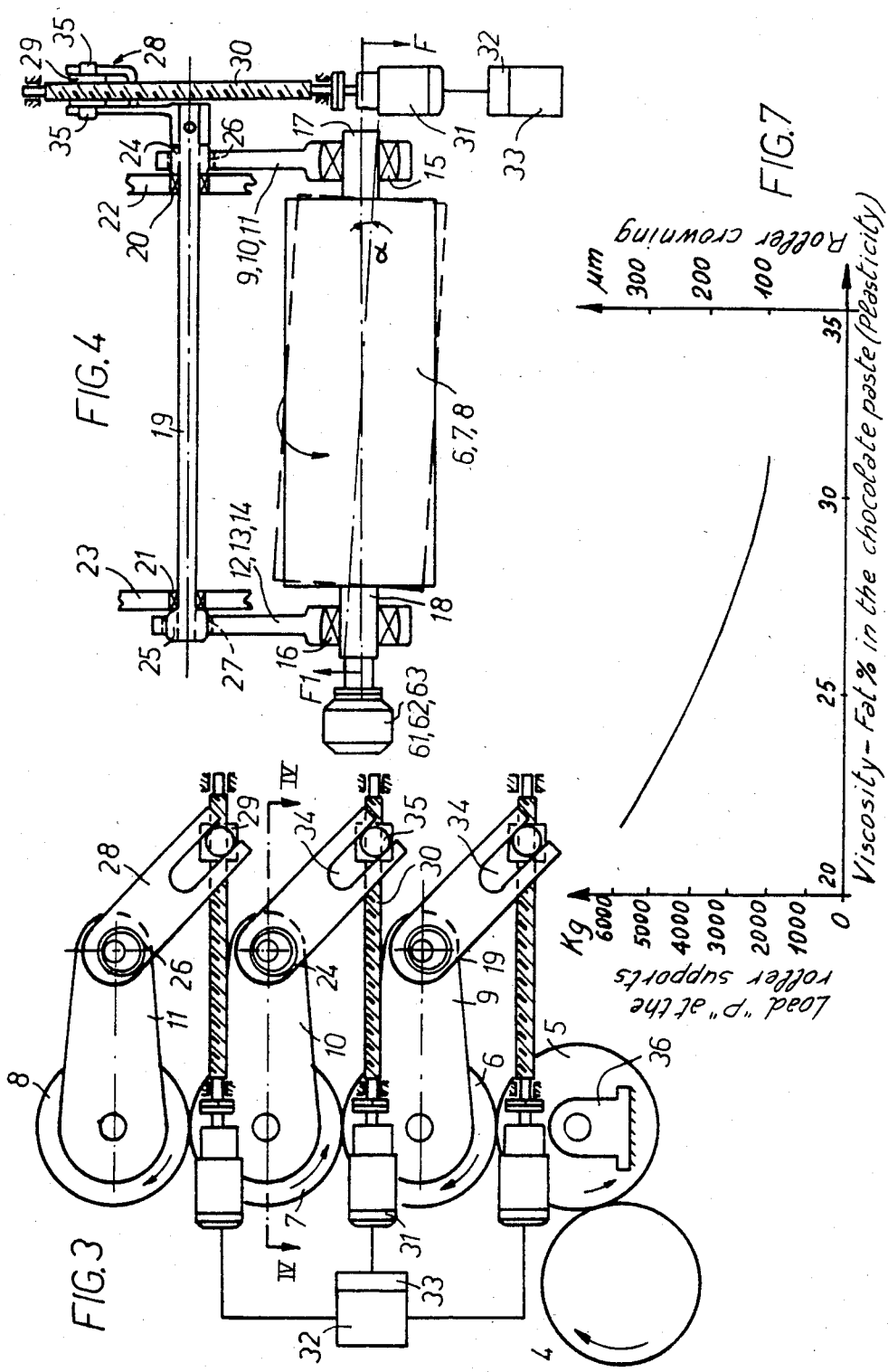

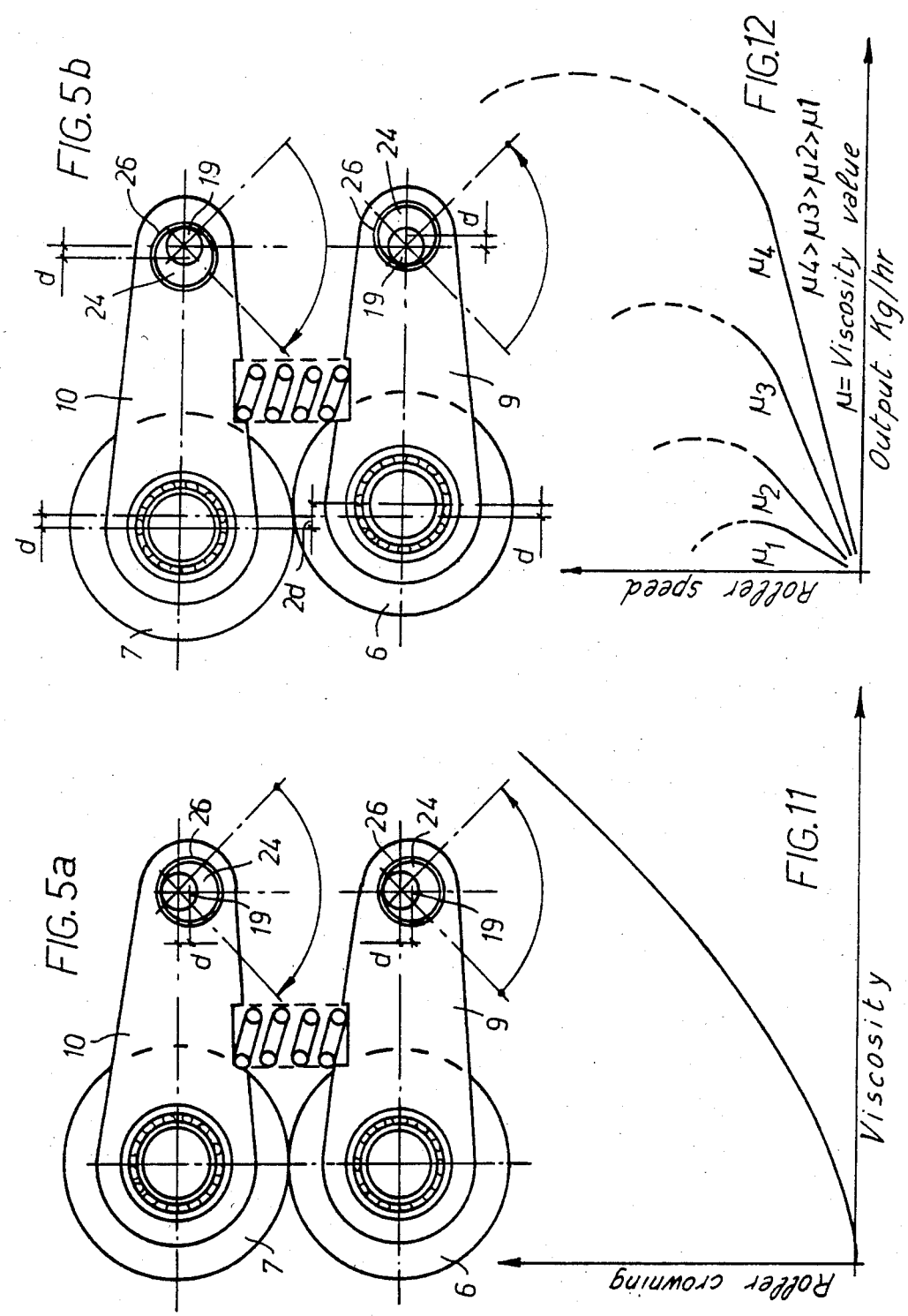

o = Preset values
+ = Result aimed at
xx = Variable value
* = Actually achieved results
≠ = Intervening differences

CONTROLLED OPERATION CHOCOLATE REFINER

BACKGROUND OF THE INVENTION

This invention relates to chocolate refiner having universal operation characteristics.

As is known in the art, chocolate refiners functions to impart chocolate with a determined fineness or grain size, while making it as homogeneous as possible. The fineness degree aimed at is dictated by the subsequent utilization of the chocolate. For chocolate products of fine quality, degrees of fineness in the order of about 15-30 $\mu$m are usual. That fineness is achieved by successively squeezing the chocolate through a plurality of refining roller pairs which are spring loaded in succession against each other, the inlet pair forming the feed-in roller pair and the last of the rollers forming the delivery roller.

With such prior machines, one can adjust the pressure on the individual rollers either separately or simultaneously on all rollers. The latter are set apart from each other to form a nip through which the material entrained therealong by adhesion is caused to pass. The speeds of the individual rollers increase from the inlet roller pair to the delivery roller. Conversely, the thickness or depth of the chocolate film will decrease from the inlet roller pair (e.g. at about 100-400 $\mu$m) toward the delivery roller (e.g. to 15-30 $\mu$m). The refining action results from a simultaneous compression or squeezing action, and a drawing or shearing action exerted on the chocolate film. The refining rollers are currently quite wide. e.g. up to about two meters wide. Accordingly, it is specially difficult to maintain such small thicknesses over such great widths with those rollers.

It is known to control the thickness of the chocolate film being delivered by varying the pressure of the refining rollers, in particular of the feed-in roller pair.

Owing to high pressure levels being used between the rollers during the refining process, the roller surfaces tend to flex inwardly, along the opposed generatrices thereof, resulting in the formation of an increased depth slit at the middle. This phenomenon is made quite appreciable by the refining rollers being of hollow construction, i.e. constructed to convey a cooling medium through their interiors, that is a medium effective to remove the heat generated during the refining process. To oppose that hogging tendency, it is known to construct the refining rollers with a degree of compensating counter-crown. The latter will, of course, be taken up in operation by a set working pressure in the presence of a product having a given viscosity. Refiners have, therefore, been constructed heretofore for given thicknesses of the chocolate films to be delivered. As the viscosity of the product to be processed varies, e.g. between batches, an attempt is made at maintaining the desired fineness by changing the roller pressure, the rollers being carried in slidable supports mounted in the machine frame.

In actual practice, it has been found that in spite of the control exerted on the refining roller support pressure, it is very difficult to achieve and maintain the desired degrees of fineness as the viscosity of the product to be processed changes, particularly where high production outputs are aimed at. Of course, for each individual refiner, the amount of crowning for each roller is determined in accordance with the experience gained by the manufacturer in relation to the characteristics of a product to be refined.

Thus, with one prior refiner, it is impossible to provide a product film having a fineness which deviate appreciably from the machine fineness rating. With products whose viscosities are markedly different, the user has been obliged heretofore to purchase a range of refiners. As an example, in the United States, highly liquid pastes are often used, whereas in Germany and Greece quite different pastes are often adopted. While this does not represent a major difficulty for large chocolate producers, the cited limitation to prior refiners may be economically unacceptable for small producers, who have been forced to modify the formulations and technological cycles of their products to meet the requirements of prior refiners and make the products processable on such machines. This reflects sometimes unfavorably on the characteristics of the finished product, because a change in the fat content of the chocolate paste, as made necessary in order to make it processable, would later affect the refining operation, which is known to impart the final product with its specific taste.

Alternatively, where the preset crowning fails to provide a product having a desired fineness, or where the product viscosity changes, it has been common practice heretofore to mechanically manipulate the machine itself. That manipulation may affect the amount of crown and roller speeds. In the former case, the rollers must be disassembled and returned to the machine manufacturer, thereafter they are delivered back to the user for reassembling, which operation usually takes some weeks. In the latter case, since speed changes would generally be small, the roller gears have to be altered or replaced. Both operations are of an empirical nature and carried out by trial and error, depending on one's experience, thereby they may be easily unsuccessful, and in all cases quite expensive, time-consuming, and the cause for considerable downtime.

SUMMARY OF THE INVENTION

It is a primary object of this invention to provide a chocolate refiner which can accommodate chocolate films of different thicknesses for processing, as well as significantly different initial viscosities thereof, thereby the refiner may be utilized as a universal type of refiner.

A further object of the invention is to provide such a refiner which can operate in a fully automated mode, that is capable of producing in a self-adjusted manner and on a continuous basis chocolate films having a desired thickness from different types or formulations of the starting chocolate paste, or in the presence of deviations thereof, thereby virtually any types of chocolate may be refined on the same machine, and by converse, for a given chocolate type, the machine may be adjusted to suit desired product and operation parameters.

These objects are achieved, according to this invention, by a refiner for mixtures and suspensions having a non-Newtonian rheological characteristic, such as chocolate, inks, paints, and the like, comprising, carried in a frame, a pair of rollers for feeding in a chocolate paste to be refined, and a plurality of refining rollers and actuators therefor, as well as a means effective to cause a pressure change on the supports for the refining rollers, characterized in that it comprises, in combination:

(a) a means effective to produce a change in the actual crowning, or in the effect of an equivalent crowning, of the refining rollers;

(b) a means effective to produce a speed change in said refining rollers; and (c) a means effective to produce a change in the pressure on the refining rollers;

a control means being associated therewith for effecting either individually or in combination required adjustment actions on said means to change the pressure on the refining rollers, and change the speed and crowning thereof, a microprocessor control unit means, and gauges for measuring a pilot reference parameter for the microprocessor, such as the thickness of the product film being delivered or the viscosity thereof, being also preferably provided.

Further embodiments of this invention are characterized by the features particularly pointed out herinbelow.

To achieve its objects, the invention utilizes the principle of acting on the pressure existing between refining rollers and simultaneously, or alternatively, also on the other two parameters which, as found in the course of actual tests, can affect the final fineness value, namely on the roller crowning and speed thereof.

By manipulating the indicated parameters, it becomes advantageously possible to achieve at any one time a desired fineness in high output rate conditions.

The roller speeds are changed according to the invention by providing each roller to advantage with an independent control which is adjustable as desired and comprises, for examples, a mechanical motor speed variator or a DC electric motor. It would be readily possible to use expanding pulleys or other devices known per se. It should be noted that by changing the speed of the first roller in the feed-in roller pair, one can influende both the final fineness degree and hourly production rate. It is further pointed out that an increase of the relative speed differential between any two adjoining rollers results in a higher degree of refining.

According to the invention, the variations in the roller crownings are accomplished indirectly by slanting the axes of two contiguous rollers with respect to each other with a pivotal motion centered on the middle of such rollers, thereby contact is maintained between the two rollers at the middle region thereof, while the gap therebetween increases gradually toward the ends. This is the equivalent, in practice, of increasing the amount of crown therein. This solution affords the important advantage of making the rollers shiftable in a relatively simple, quick, and reliable manner using conventional means.

In a further embodiment of this invention, a crowning change is produced by changing the pressure level of the liquid coolant contained within the rollers, thereby the crowning change is substantially proportional to the variation in the applied pressure.

Said pressure may be varied advantageously with the intermediary of devices and circuitry known per se.

Advantageously, according to the invention, any variations of the adjustment parameters, and specifically of the roller pressure, crowning, and speeds, are determined or established automatically through an intervening microprocessor. The latter would process input signals representative of a reference parameter, e.g. thickness or fineness of the chocolate film being delivered, or of the viscosity of the chocolate batch to be treated, and supply output signals causing an adjustment action being brought about on one or more of the adjustment parameters. The thickness of the film being delivered may be measured indirectly and advantageously by means of a colorimeter, as disclosed in Italian Application No. 20 718 A/83 by this same applicant. Since the effects of adjusting a single adjustment parameter, such as the roller pressures, crownings, or speeds, also reflects on the remaining two parameters influensing them, the selection of the parameter(s) of adjustment to be acted upon will be made either manually, in the instance of manual adjustment facilities, in accordance with operation curves of the refiner, or directly by the microprocessor in accordance with stored reference values or specific routines.

BRIEF DESCRIPTION OF THE DRAWINGS

Further features, advantages, and details of the inventive refiner will be more clearly understood from the following description, with reference to the accompanying drawings, wherein a preferred embodiment of a refiner according to the invention is shown.

In the schematic drawings:

FIG. 1 is a side elevation view of two crowned refining rollers of a conventional type;

FIGS. 1a, 1b, and 1c, are sectional views taken in the planes 1a—1a and 1b—1b, and an end view in the direction of the arrow c, respectively;

FIG. 2 is a top plan view of the arrangement of two refining rollers according to the invention, which are supported in a mutually swinging fashion to create profile gaps therebetween being the equivalent of prior crownings;

FIGS. 2a, 2b, and 2c are vertical cross-section views taken in the planes 2a—2a and 2b—2b, and an end view in the direction of the arrow c in FIG. 2, respectively;

FIG. 3 is a side elevation view illustrative of the principle underlying a refiner according to the invention;

FIG. 4 is a sectional view taken along the line IV—IV of FIG. 3;

FIGS. 5a and 5b show in detail, respectively, a side view of two superimposed refining rollers in a condition of coplanarity in the vertical plane containing their longitudinal axes (FIG. 5a), and in a swung out condition in a vertical plane from said common vertical plane;

FIG. 7 is a graph illustrating the principle underlying the relationships between the pressure load on the refining roller supports, the amount of crown of the rollers, and the percent of fat in the chocolate paste, or viscosity thereof;

FIGS. 11 and 12 are graphs illustrating the relationships between the roller crownings and viscosity of the product in FIG. 11, and between the machine speed and output thereof in FIG. 12.

DESCRIPTION OF A PREFERRED EMBODIMENT

Figure 6:
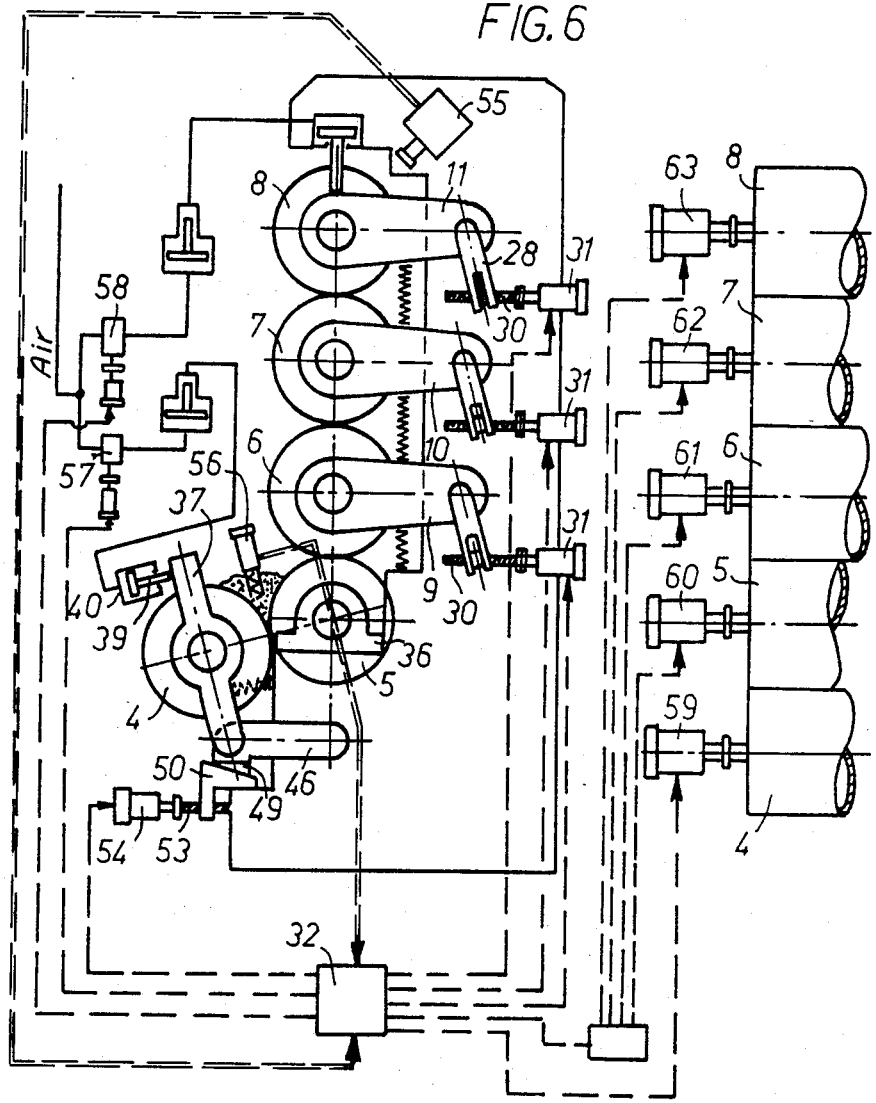
FIG. 6 is a side elevation view illustrating the principle underlying this invention refiner with the general operating circuitry therefor.

Making reference to the drawing views, where similar parts are identified with like reference characters, FIGS. 1 and 2 show two contiguous refining rollers having a profile shaped lateral surface, i.e. a crowned one as shown in an exaggerated way for clarity of illustration. Such profiles follow essentially a symmetrical parabola pattern. In the example shown, the two rollers 1 and 2 have coplanar longitudinal axes, thereby the same, when viewed from above, overlap each other. The parabola profiles are are arranged to touch each other at the midpoint 0 and move gradually away toward the ends. This condition corresponds to a zero load or pressure condition of the refining roller supports. In operation, the pressure on the roller supports will cause a deflection in the crowned profile at the respective opposed generatrices, thereby the creation of the most uniform gap or product thickness possible is approximated over the entire length of the rollers. Actually, and as mentioned hereinabove, with a fixed profile design this may only be achieved within a very small thickness range and in the presence of uniform product viscosity and operating parameters, such as speed, output rate, etc.

According to the invention, in order to provide at any one time the required amount of crowning to meet individual requirements, the use of devices is herein proposed which are effective to determine a variation in the real crowning effect, that is in the actual crowning measurable on the rollers, or equivalent crowning. In the former case, the invention provides for the use of pressure amplifiers, indicated at 3 in FIG. 1, acting on the pressure of the liquid coolant inside the rollers. By raising the pressure of the liquid coolant, the amount of crowning is increased, and viceversa. According to the invention, a means of controlling the temperature of the liquid coolant is also provided in order to be able to also control the roller temperature in a desired way.

An equivalent crowning variation may be obtained, advantageously according to the invention, by the provision of an oscillating support for the refining rollers, as shown in FIGS. 2 to 6. In this embodiment, the rollers may be made truly cylindrical because the crowning effect would be achieved by the expedient of causing said rollers to oscillate with respect to each other, acting either on each roller or both rollers. In the example shown, the rollers overlap and may be swung in a vertical plane about the vertical midaxis of said rollers, indicated at 0'. Each variation in the roller angle of oscillation results in a change of the distance separating the centers of the end circumferences, which occurs proportionally also with the various circumferences included between the end and middle ones, which are at all times in contact irrespective of the angle of oscillation selected.

Thus, such rollers form "variable crowning" rollers.

The swinging support device for the refining rollers, according to the invention, will be now described with reference to FIGS. 3–6. The rollers of the refiner are indicated at 4, 5, 6, 7, and 8, respectively. The rollers 4 and 5 form the first and second rollers in the pair of feed-in rollers, and the roller 8 forms the delivery roller.

In the example shown, the rollers 6, 7, and 8 are carried individually in a support 9, 10, 11 at one end, and in a support 12, 13, 14 at the other end. Such supports have been selected with the same configuration for the rollers 6, 7, 8, as shown particularly in FIG. 4. They accommodate bearings 15, 16 carrying the end spindles 17, 18 of the rollers. The supports 9, 10, 11 and 12, 13, 14 are connected together by a shaft 19 which is carried, through bearings 20, 21, on the uprights 22, 23 of the frame, no further illustrated, of the refiner. As may be seen particularly in FIGS. 3 and 4, the shaft 19 has at its ends respective cams or eccentric spindles 24, 25 juxtaposed with respect to each other. The cams 24 and 25 are accommodated in two bushings 26, 27, respectively on the supports 9, 10, 11 and 12, 13, 14. A 90 degrees rotation of the shaft 19 causes a like rotation of the cam 24, which moves the support 9 in the direction of the arrow F, while the cam 25 moves the support 12 in the opposite direction as indicated by the arrow F1. There results an oscillation of the longitudinal axis of the roller 6 through an angle $a$ in the horizontal plane.

At the ends, the axis of the shaft 19 and associated roller will be shifted from its preceding position at one end by an amount "d" equal to the amplitude of the oscillation by the cam 24, and at the other end, by a similar amount "d" equal to the amplitude of the cam 25, since both cams 24 and 25 have similar dimensions.

The 90-degree movement of the cams about the axis of the shaft 19 is accomplished by means of a lever 28. The latter is driven by a nut screw 29 engaging with the worm 30 which is driven rotatively by a DC motor 31. The latter may be controlled either independently or, as explained hereinafter, by means of a control microprocessor 32. Indicated at 33 is an interface or converter of digital-analog signals.

The engagement of said lever 28 with the nut screw 29 is accomplished, as shown in FIGS. 3 and 4, by means of a throughgoing end seat 34 of slit-like configuration in the forked end of the lever 28, wherewith two opposed pins 35 of the nut screw 29 engage.

Shown in detail in FIG. 5a are two adjacent rollers such as 6 and 7, the longitudinal axes whereof lay in a common vertical plane and the respective cams 24 whereof are in their upper positions. Following rotation of the same, or of their shaft 19, through 90°, said cams will bring about a displacement of associated supports 9, 12 and 10, 13, or of the related pivots of the rollers 6 and 7, by an amount "d" equal to the cam amplitude of oscillation, as may be seen in FIG. 5b. In the example shown, accordingly, the rollers 6 and 7 will be offset at their ends by an amount 2d.

Figure 6A:
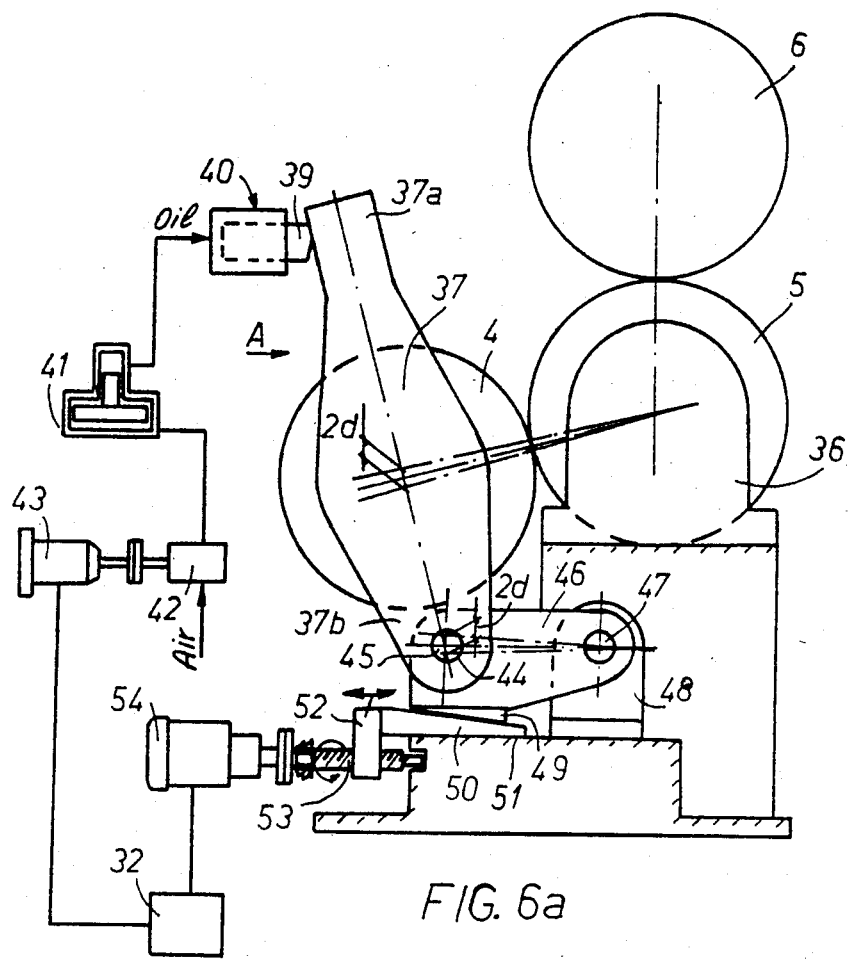
FIG. 6a is a detail view, to an enlarged scale, of the supporting arrangement for the first roller in the feed-in roller pair including a bearing and oscillating device according to one embodiment thereof.
Figure 6B:
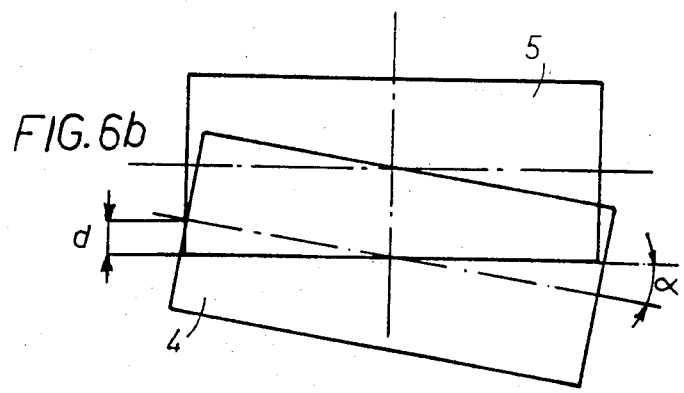
FIG. 6b is a reduced scale general view taken in the direction of the arrow A of FIG. 6a, showing one swung position of said first roller in the feed-in roller pair.

While in the example shown the rollers 6, 7, and 8 are supported swingingly by means of the supporting devices illustrated, in the instance of the roller 5 in the pair of feed-in rollers 4 and 5, this has end supports 36 made rigid with the refiner frame (FIG. 6). The roller 4 is supported, in the example considered, to be displaceable by an oscillating supporting device configured, by way of example, in accordance with a modification with respect to the device illustrated for the rollers 6, 7, and 8. The oscillating support for the roller 4 is shown best in FIGS. 6 and 6a. That support comprises two lateral sides 37 which support, at the middle region thereof, the pivot pins or spindles of the roller 4 and cooperate at their upper ends 37a with a reaction abutment 39 of an oil-operated device 40 rigid with the machine frame and controllable through a pressure amplifier 41 associated with a pneumatic servocontrol 42. The same, in the instance of a central control unit, is connected to a drive motor 43 piloted by the microprocessor 32. The lateral sides 37 have holes 44 formed at their opposed ends 37b which accommodate a spindle, or journalled end 45 of the shaft, in turn housed in a corresponding seat of a respective oscillating lateral side 46. Said lateral sides 46 are hinged at 47 to a respective end support 48 rigid with the refiner frame. The oscillating lateral sides 46 have an oblique lower side 49 in the form of an abutment incline wherewith cooperates a respective actuating incline 50, set slidable over a respective bearing surface 51 rigid with the machine frame. Each incline 50 is made rigid at one end with a nut screw 52 which is threaded onto a worm 53 adapted to be rotated by a reversible electric motor 54. The same, in the central control unit embodiment, is connected to the microprocessor 32. Rotation of the worm 53 in either directions causes the incline 50 to be moved forward or rearward, with attendant raising or lowering of the oscillating lateral sides 46 and consequently of the lateral sides 37, and hence of the cylinder 4. In order to make the movements smoother, intervening rolling bodies may be introduced, e.g. in the form of balls or rollers, between the sliding surfaces. Shown in FIG. 6b is the oscillatory movement of the roller 4 relatively to the next roller 5.

FIG. 6 depicts the whole assembly formed by the oscillatory supporting device for the refining rollers and the air-oil circuit and the powered pressure regulators for controlling and adjusting the pressure of the refining rollers 6, 7, and 8. In FIG. 6, there are indicated at 55 and 56, respectively, a colorimeter and viscosimeter. The same function to provide a reference quantity indicative, respectively, of the thickness of the chocolate film beng delivered and of the viscosity of the chocolate batch being fed in, in order to provide a reference parameter for the central control unit of the refiner. The colorimeter and viscosimeter may be any ones. A suitable colorimeter is disclosed in Italian Patent Application No. 20 718 A/83, filed on Apr. 21, 1983 by this same applicant. The colorimeter serves the purpose of supplying a control unit, advantageously a microprocessor, with processed values of the delivered film color, as sensed and indirectly representative of the thickness thereof. With these devices the real thickness of the film being delivered is monitored over its entire width, or the possible appearance of so-called "dry bands" is monitored. In the refiner according to the cited application, the processed optical readout signals are utilized to control the pressure to the supports of the refining rollers. According to this application, the same function to pilot the microprocessor 32. That same piloting action could be provided by signals supplied from the viscosimeter 56 located directly upstream of the feed-in roller pair, 4 and 5. In the instance of the colorimeter, sensing of a darker color hue means a larger thickness than a paler hue sensing. Thus, if in operation a darker zone is sensed at the middle region of the chocolate film being delivered, then this may either mean that an insufficient pressure is applied to the refining rollers or that the crownning amount is too low, or both. To restore the desired conditions, a pressure increase will be then brought about through the regulators 57, 58 (FIG. 6), and if that action proves inadequate, then the crowning effect value is increased by acting on the oscillatory supporting devices through their actuators 54 and 31 until the color hue on the film being delivered shows to be once again uniform over the entire width thereof.

It should be enhanced that in treating highly viscous products, i.e. on the occurrence of a viscosity increase in the body or batch of chocolate to be treated, one is first of all to increase the pressure on the first roller 4. Should that action be inadequate to provide the required fineness, one would then act on the speed of said roller 4 by reducing it, and optionally and proportionally, by reducing also that of the following refining rollers.

Upon the occurrence of a chocolate film which is delivered with a greater fineness at its middle region, the amount of crowning of the first refining roller 6 shall have to be increased and, if necessary, also the amount of crowning in the other refining rollers is to be increased proportionally.

In the presence of a very flowable starting body, opposite adjustments to what is stated hereinabove must be effected with highly viscous or denser products.

It should be enhanced here that to achieve an increase in output, it will be sufficient to increase the speeds of the gear motors 59, 60, 61, 62, 63 associated with the rollers 4-8, leaving the speed ratii otherwise unaltered. In fact, an increase in the feed-in-rate would result in an increased chocolate paste demand by the machine, that is by the roller pair 5, 6, and accordingly, in an increased thickness of the chocolate film across all the rollers, including the last refining roller 8, whereat the increased thickness will be advantageously monitored by the cited colorimeter 55.

The individual actions on pressure, speed, and crowning provided by this refiner may be either effected manually, that is by manually operating the corresponding controls, or through a microprocessor central unit control. The use of a microprocessor affords full automation of the refiner, whose operation may accordingly be piloted, e.g. by means of cards or routines, in accordance with the different chocolate types or pastes to be refined.

Shown in FIG. 7 is a graph setting forth in principle the relationship between the viscosity or plasticity (expressed as fat percent in the chocolate paste) of a given chocolate paste, the pressure P in kilograms to be applied to the supports of the refining rollers, and the sum of the crownings a roller pair should have for the respective opposed generatrices of said rollers to be truly parallel in operation, that is when subjected to a given pressure load "P".

Figure 8:
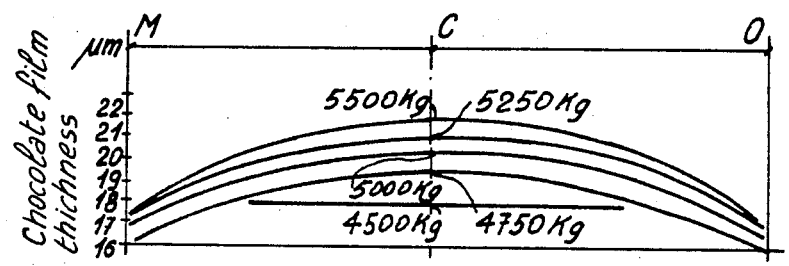
FIG. 8 illustrates how the thickness of the chocolate film being delivered varies as the pressure exerted thereon varies in prior refiners having a fixed roller crowning.

FIG. 8 shows the thickness values for the product film being delivered at the delivery refining roller 8, as measured, for example, in a prior refiner having a fixed crowning, in the presence of a uniform or constant speed product throughout the measuring period and at different pressures, as specified. The side M denotes the motor side, the middle region is indicated at C, and the remote side to the motor side is indicated at O. The M-O segment denotes the roller length. It may be gathered from the graph that at a pressure of 4,500 kg a thickness is achieved of 18 $\mu$m for the chocolate film over the entire width thereof. If the pressure is to be increased, in order to achieve a higher film fineness, an actual fineness decrease is determined in practice at the end regions of the chocolate film, while at the middle portion thereof a growing thickness increase is recorded due to a progressive hogging of the various refining roller pairs at the opposed generatrices thereof.

Figure 10:
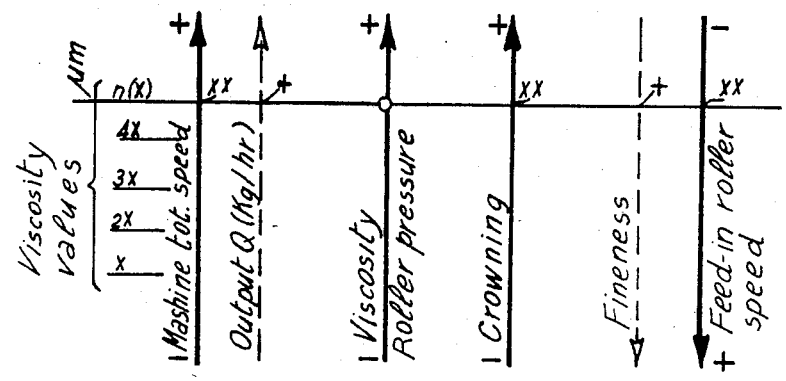
FIGS. 9 and 10 are graphs illustrating the relationships existing between the various parameters of the product and of operation, respectively in a prior machine, or one having fixed crownings and speeds (FIG. 9), and a machine according to the invention, that is with variable crownings and speeds (FIG. 10)
Figure 9:
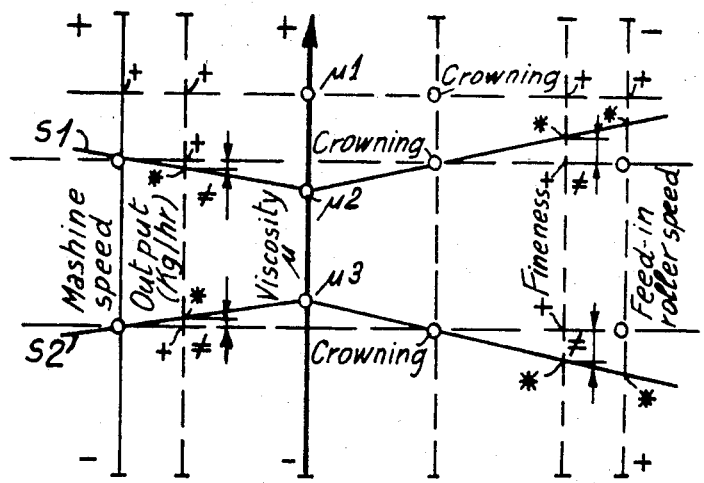

To further explain the different influences of the various parameters on the machine performance, the graphs of FIGS. 9 and 10 reflect the relationships between the different parameters which are to be considered in connection with adjustment actions, namely viscosity, crowning, and pressure, in conjunction with other product parameters of determining interest, such as the product fineness, and operative parameters, such as the speed of the first roller, output rate in kg/hour, and viscosity of the starting product. The required conditions for the desired operation are set forth on an exemplary straight line. The individual symbols mean:

o = preset values
+ = result aimed at
xx = variable value
* = actually achieved results
≠ = intervening differences.

In plotting the graphs, the following function f relations between the various parameters have also been taken into account:

output Q=f speed of the feed-in roller pair,
viscosity=f crowning and machine speed,
crowning=f pressure on the rollers,
fineness=f speeds of the feed-in roller pair and refining rollers.

The full lines represent the settable parameters and the dash lines the consequent ones. In FIG. 9, the broken lines S1 and S2 denote the variations conceptually intervening for the various parameters considered as the viscosity, $\mu 2$ and $\mu 3$, of the chocolate paste being fed in varies, and specifically, in the vent of the same decreasing (S1) and increasing (S2). The distances between single points on the broken lines and straight line for balanced operation, that is illustrating the respective overall conditions for the desired operation, show the conceptual deviations of the respective parameters.

The crowning-viscosity interrelation may be observed in FIG. 11. It is shown therein that the rolling pressure is directly proportional to the thickness differential between the thicknesses upstream and downstream of each roller pair. As the product viscosity increases, the boundary layer thickness also increases and the cited thickness differential with it, namely the pressure exerted by the product on the two rollers. To achieve uniform degrees of fineness, accordingly, the amount of crowning will be increased.

FIG. 12 shows how hourly output is increased by increasing the speeds of the rollers—while keeping the ratii therebetween constant. That increase varies, however, as a function of the product viscosity.

It may be appreciated from the foregoing description of the embodiments proposed and operation of the machine according to the invention that the latter can effectively achieve the object underlying the present invention and the advantages stated in the preamble. In particular, a refiner has been provided which has a highly flexible operation and can accommodate virtually any chocolate pastes in conditions as desired for each specific situation.

In practice, it will be readily possible to replace individual parts with other technically and/or functionally equivalent parts, as well as to use servocontrols of any suitable types, without departing from the true scope of this invention.

The oscillating supports for the rollers may also deviate from the two embodiments thereof given above by way of example, again without departing from the scope of the invention.

Substantial to the invention is the provision in the same refiner of three individual control facilities, or combined facilities, as regards roller pressure, speed, and crowning. Also substantial is the provision of a central control unit with a microprocessor, in order to achieve operation conditions which are both fully automatizable and capable of providing the required results starting from materials which may be originally different.

While reference has been made throughout the above description to chocolate as a prime material, it will be obviously understood that the inventive refiner may be employed with any mixtures or suspensions in the plastic state, irrespective of the non-Newtonian rheological characteristics thereof, such as with inks, paints, etc.

All of the features which can be inferred from this specification, appended claims, and accompanying drawings are regarded as essential to this invention, either singly or in any combination thereof.

We claim:

1. A refiner for mixtures and suspensions having non-Newtonian rheological characteristics, such as chocolate, inks, and paints, comprising, carried in a frame, a pair of feeding rollers for feeding in a chocolate paste to be refined, and a plurality of refining rollers and actuators therefor, and means effective to cause a pressure change on the supports for the refining rollers; characterized in that it comprises in combination:
    (a) means effective to produce a change in the crowning of the refining rollers;
    (b) means effective to produce a change in the crowning of one feeding roller;
    (c) means effective to produce a speed change in said refining rollers;
    (d) means effective to produce a change in the pressure on the refining rollers;
    (e) first and second gauge means for measuring pilot chocolate parameters of viscosity and thickness, respectively, whereby either one or both of the measured values are utilized for controlling corrective actions; and
    (f) a microprocessor control unit responsive to signals indicative of either one or both of the measured values of said parameters, for centrally controlling corrective actions on the operation to be applied to said means effective to produce a change in either one of a combination of the crowning, the speed, and the pressure on the refining rollers and on a feeding roller, thereby providing proper refining of various types and mixtures of chocolate, irrespective of the starting physical and chemical characteristics thereof, and as same vary during refiner operation.

2. A refiner according to claim 1, wherein said means effective to produce a change in the crowning of the refining rollers consists for each refining roller of an oscillating supporting device comprising two respective side supports carrying at one end, with the interposition of bearings, the spindle ends of said refining roller, and having at the opposed end, respectively, an eccentric spindle formed juxtaposed to each other, consisting of the ends of a connecting shaft carried, in turn and with the interposition of bearings, in the refiner frame uprights, a cam being accommodated in a bushing provided in one end of a lever having two legs at an opposed end of yoke-like configuration, respectively, a pin and nut screw carried on a worm connected to and driven by a motor, whereby a displacement of said nut screw effects an oscillation of said connecting shaft and, by means of said eccentric spindle thereof, causing an oscillation shifting of said supports for producing a change in the crowning of said associated refining roller.

3. A refiner, according to claim 1, wherein said means effective to produce a change in the crowning of a feeding roller consists of an oscillating supporting device comprising two lateral sides supporting the spindles of said feeding roller and cooperating at the top ends thereof with a reaction abutment, said lateral sides being hinged with the bottom ends thereof to a respective one of said lateral sides arranged to oscillate and being in turn hinged to the refiner frame and having at the bottom an abutment side in the form of an incline, a control incline firmly associated with the nut screw of a respective worm driven by a reversible motor cooperating with said first-mentioned incline, whereby a displacement of said control incline results in said abutment incline being raised or lowered, causing the supported roller to be swung relative to to an adjoining roller.

* * * * *